US011742927B2

(12) United States Patent
Zhou et al.

(10) Patent No.: US 11,742,927 B2
(45) Date of Patent: Aug. 29, 2023

(54) TECHNIQUES FOR DETERMINING CANDIDATE BEAMS TO SUPPORT FULL-DUPLEX COMMUNICATION

(71) Applicant: QUALCOMM Incorporated, San Diego, CA (US)

(72) Inventors: Yan Zhou, San Diego, CA (US); Tianyang Bai, Somerville, NJ (US); Navid Abedini, Basking Ridge, NJ (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 17/317,690

(22) Filed: May 11, 2021

(65) Prior Publication Data

US 2021/0376904 A1 Dec. 2, 2021

Related U.S. Application Data

(60) Provisional application No. 63/032,385, filed on May 29, 2020.

(51) Int. Cl.
  *H04B 7/06* (2006.01)
  *H04W 24/10* (2009.01)
  *H04L 5/14* (2006.01)
  *H04B 17/318* (2015.01)
  *H04B 17/336* (2015.01)

(52) U.S. Cl.
  CPC ......... *H04B 7/0695* (2013.01); *H04B 17/318* (2015.01); *H04B 17/336* (2015.01); *H04L 5/14* (2013.01); *H04W 24/10* (2013.01)

(58) Field of Classification Search
  CPC .. H04B 7/0695; H04B 17/318; H04B 17/336; H04L 5/14; H04W 24/10
  See application file for complete search history.

(56) References Cited

U.S. PATENT DOCUMENTS

| | | | |
|---|---|---|---|
| 2018/0199328 A1 | 7/2018 | Sang et al. | |
| 2019/0081688 A1* | 3/2019 | Deenoo | H04L 5/0069 |
| 2019/0116605 A1 | 4/2019 | Luo et al. | |
| 2019/0159155 A1* | 5/2019 | Abedini | H04W 72/20 |
| 2019/0191399 A1* | 6/2019 | Islam | H04W 56/009 |
| 2019/0215888 A1 | 7/2019 | Cirik et al. | |
| 2019/0261344 A1* | 8/2019 | Grant | H04B 7/088 |

(Continued)

FOREIGN PATENT DOCUMENTS

| | | |
|---|---|---|
| WO | 2018085144 A1 | 5/2018 |
| WO | WO-2019164363 A1 * | 8/2019 |

(Continued)

*Primary Examiner* — Deepa Belur
(74) *Attorney, Agent, or Firm* — ArentFox Schiff LLP/Qualcomm Incorporated

(57) ABSTRACT

Aspects described herein relate to communicating a configuration indicating resources for measuring new candidate beam pairs for full-duplex operation to facilitate measuring one or more new candidate beam pairs over the resources to determine measurement results for the one or more new candidate beam pairs, and reporting, based on a measurement result for at least one new candidate beam pair of the one or more new candidate beam pairs, the measurement result or an indication of the at least one new candidate beam pair.

30 Claims, 6 Drawing Sheets

(56) References Cited

U.S. PATENT DOCUMENTS

2021/0376905 A1    12/2021  Zhou et al.
2022/0210816 A1*   6/2022  Wu ..................... H04B 7/0408
2022/0264318 A1*   8/2022  Nilsson ................. H04B 7/088

FOREIGN PATENT DOCUMENTS

WO    WO-2020221432 A1 *  11/2020
WO    WO-2021223865 A1 *  11/2021  ............ H04W 52/08

* cited by examiner

TECHNIQUES FOR DETERMINING CANDIDATE BEAMS TO SUPPORT FULL-DUPLEX COMMUNICATION

CLAIM OF PRIORITY UNDER 35 U.S.C. § 119

The present Application for Patent claims priority to Provisional Patent Application No. 63/032,385, entitled "TECHNIQUES FOR DETERMINING CANDIDATE BEAMS TO SUPPORT FULL-DUPLEX COMMUNICATION" filed May 29, 2020, which is assigned to the assignee hereof and hereby expressly incorporated by reference herein for all purposes.

BACKGROUND

Aspects of the present disclosure relate generally to wireless communication systems, and more particularly, to using beams in full-duplex communication.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the memory and the transceiver. The one or more processors are configured to execute the instructions to cause the apparatus to communicate with a base station using one or more current beam pairs for full-duplex operation, receive a configuration indicating resources for measuring new candidate beam pairs for the full-duplex operation, measure one or more new candidate beam pairs over the resources to determine measurement results for the one or more new candidate beam pairs, and report, based on a measurement result for at least one new candidate beam pair of the one or more new candidate beam pairs, the measurement result or an indication of the at least one new candidate beam pair.

In another aspect, an apparatus for wireless communication is provided that includes a transceiver, a memory configured to store instructions, and one or more processors communicatively coupled with the memory and the transceiver. The one or more processors are configured to execute the instructions to cause the apparatus to communicate with a user equipment using one or more current beam pairs for full-duplex operation, transmit a configuration indicating resources for measuring one or more new candidate beam pairs for the full-duplex operation, and receive, based on transmitting the configuration, a measurement result or an indication of at least one new candidate beam pair of the one or more new candidate beam pairs.

In another aspect, a method for wireless communication is provided that includes communicating with a base station using one or more current beam pairs for full-duplex operation, receiving a configuration indicating resources for measuring new candidate beam pairs for the full-duplex operation, measuring one or more new candidate beam pairs over the resources to determine measurement results for the one or more new candidate beam pairs, and reporting, based on a measurement result for at least one new candidate beam pair of the one or more new candidate beam pairs, the measurement result or an indication of the at least one new candidate beam pair.

In yet another aspect, a method for wireless communication is provided that includes communicating with a user equipment using one or more current beam pairs for full-duplex operation, transmitting a configuration indicating resources for measuring one or more new candidate beam pairs for the full-duplex operation, and receiving, based on transmitting the configuration, a measurement result or an indication of at least one new candidate beam pair of the one or more new candidate beam pairs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
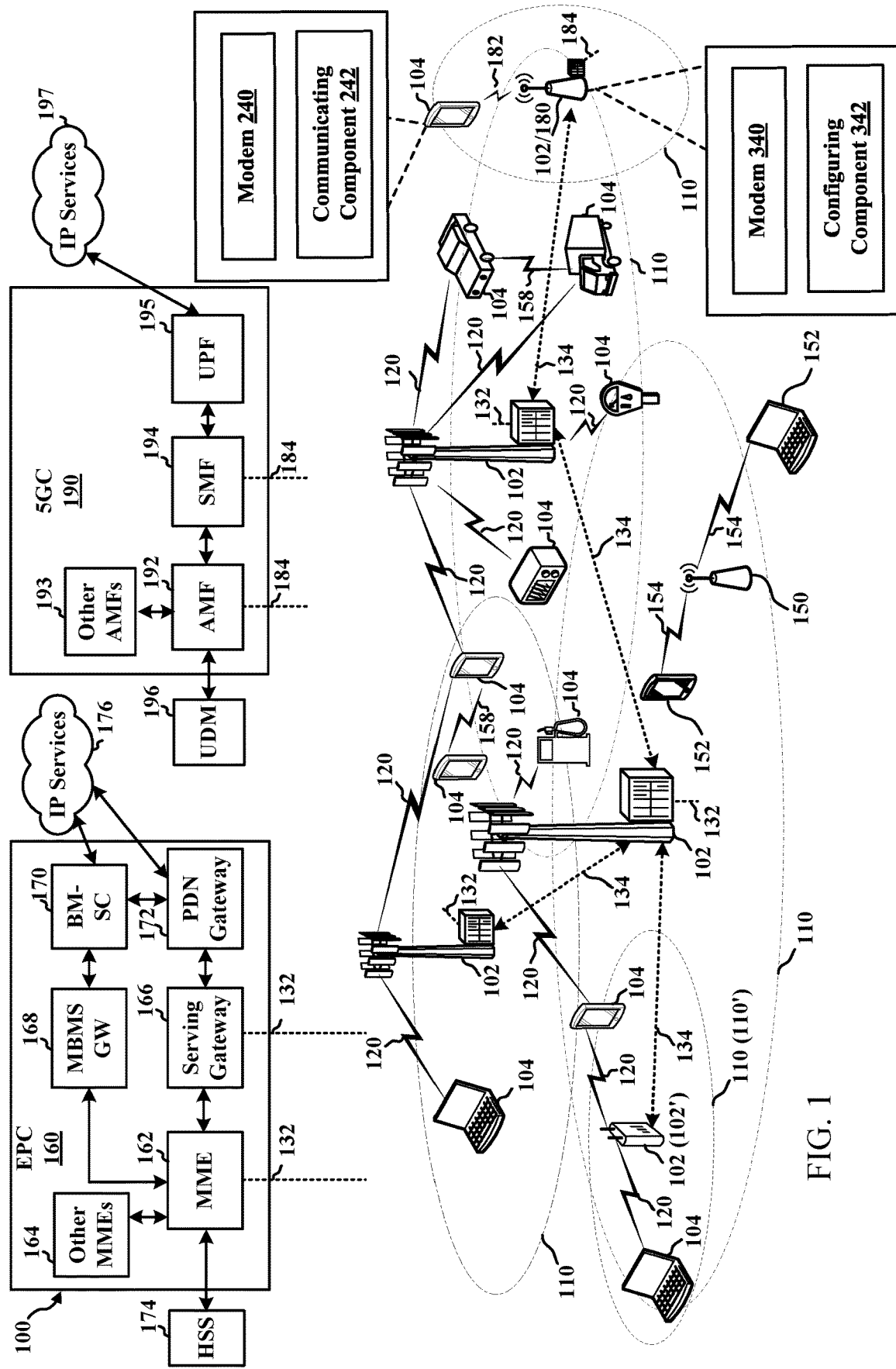
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to determining candidate beams to support full-duplex communication. For example, a device can be configured to communicate in a wireless network based on a transmit and receive beam pair, which can be used to enable full-duplex communication. As the device moves throughout the network, the current beam pair may not be as desirable as when first configured. For example, this may be caused by changes in orientation of the device with respect to another device or base station with which the device communicates, movement of obstructing or reflecting entities or movement of the device with respect to such obstructing or reflecting entities, etc. Accordingly, the device can measure new candidate beam pairs to be used in the full-duplex communication, and can report one or more new candidate beam pairs to facilitate configuration of the one or more new candidate beam pairs for the device and/or for a serving base station, etc.

Full-duplex (FD) communication, as referred to herein, can include concurrent transmitting and receiving by a device. For example, a user equipment (UE) in fifth generation (5G) new radio (NR) or other radio access technologies can communicate in full-duplex by concurrently transmitting uplink (UL) communications to a base station or transmission/reception point (TRP) and receiving downlink (DL) communications from the base station or TRP (or another base station or TRP). Similarly, a base station can communicate in FD by concurrently transmitting downlink communications to a UE and receiving uplink communications from the UE. FD communication can also be referred to as flexible time division duplexing (TDD). In addition, in 5G NR for example, flexible TDD can correspond to simultaneous uplink/downlink transmission in frequency range 2 (FR2). As described above, flexible TDD capability can be present at either the base station (e.g., gNB) or UE or both. For instance at UE, UL transmission can be from one panel and DL reception in another panel, and/or can be conditioned on beam separation at the panels. Flexible TDD can provide latency reduction where it can be possible to receive DL signal in UL only slots, which can enable latency savings. Flexible TDD can also provide spectrum efficiency enhancements (e.g., per cell, per UE), more efficient resource utilization, etc.

In one example, FD communications can include a first case where one UE operates in FD to communicate with a first TRP via DL and a second TRP via UL, where a base station may provide both TRPs, but each TRP may operate half-duplex. In another example, FD communications can include a second case where one base station can operate in FD to communicate with a first UE via DL and a second UE via UL, where the UEs may operate half-duplex. In another example, FD communications can include a third case where one BS and one UE may operate in FD to communicate with one another concurrently via DL and UL. One possible issue with FD communications can include self-interference at the device that supports FD communication, where a transmitted signal may leak into a receive antenna port and/or where a transmitted signal may be reflected by an object (or clutter) back into the receive antenna port (referred to as clutter echo). Reducing self-interference (SI) (especially for clutter echo, which may occur sporadically) can be mitigated by spatial isolation between the transmitted signal and the receive antenna port. Spatial isolation may be achieved by choosing transmit and receive beam pairs that do not result in self-interference. For example, the transmit and receive beams can be achieved by beamforming antenna resources (e.g., selectively applying power to antenna resources) to achieve a directionality for transmitting or receiving signals.

To determine whether a device can support FD capability or to enable/enhance FD communications, the device can perform self-interference measurement based on candidate beam pairs. For example, while the device is sending a signal from a first set of antennas (on one or more transmit beam directions), the device can measure the received signal (e.g., as reflected or leaked transmit signal) on a second set of antennas (on one or more receive beam directions). In some examples, the first and second set of antennas may be the same or may include at least some of the same antennas. Where the measured received signal is below a threshold signal power or quality, for example, the device can support and/or enable FD communications. In FD operation, e.g. the first case or third case above where the UE is in FD communications, the originally identified DL/UL beam pair(s) at the device may have degraded performance or even failure due to stronger leaked self-interference, e.g. due to device mobility, device rotation, moving objects or reflectors that cause clutter echo, etc. In an example, the base station (e.g., gNB) or an FD operation manager can identify the degraded/failed current FD beam pair(s) at the device in time. For example, an FD operation manager can be a function or node of a wireless network, accessible via a base station, that can perform the functionality described herein related to determining beam pairs for a UE and/or base station to use in communicating in the wireless network. As replacement, new candidate FD beam pair(s) can be identified before or after the detection of the degraded performance for the current FD beam pair(s).

In aspects described herein, a device in FD communications can receive a configuration for measuring new candidate beams and can measure and report new candidate beam pairs to a base station. For example, the base station can generate and transmit the configuration to the device based on a reported quality of a current beam pair and/or can provide the configuration as indicating a periodic measurement during which the device can measure new candidate beam pairs in addition to the current beam pair. The device can report the measurements and/or an identification of the new candidate beam pair based on one or more reporting criteria. The base station can, based on the report, configure one or more new candidate beam pairs for the device to use in subsequent communications. In addition, the device may configure (e.g., based on a received signaling from the base station or based on detecting the one or more new candidate beam pairs) the one or more new candidate beam pairs for subsequent communications with the base station. This can allow for modification of the beam pair used for FD communications to avoid self-interference at a device, which may be caused when the device moves or rotates, when clutter becomes present, etc.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for measuring and reporting candidate beam pairs, in accordance with aspects described herein. In addition, some nodes may have a modem 340 and configuring component 342 for configuring a device to measure and report candidate beam pairs, in accordance with aspects described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190)

with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of a UE 104 can measure and report new candidate beam pairs for use in communicating in full duplex. For example, communicating component 242 can measure the new candidate beam pairs based on a configuration received from the base station 102, based on requesting the configuration from the base station 102, based on determining that a current beam pair has self-interference that achieves a threshold, based on determining that a candidate beam pair does not exhibit threshold self-interference (and/or is subject to less self-interference than the current beam pair), etc. In one example, configuring component 342 can configure the UE 104 to measure and report the candidate beam pair measurements for determining the new candidate beam pair. In another example, configuring component 342 can configure the UE 104 to use the new candidate beam pair based on determining that an associated measurement result is below a threshold, is at least a threshold improved over the current beam pair, etc.

Figure 2:
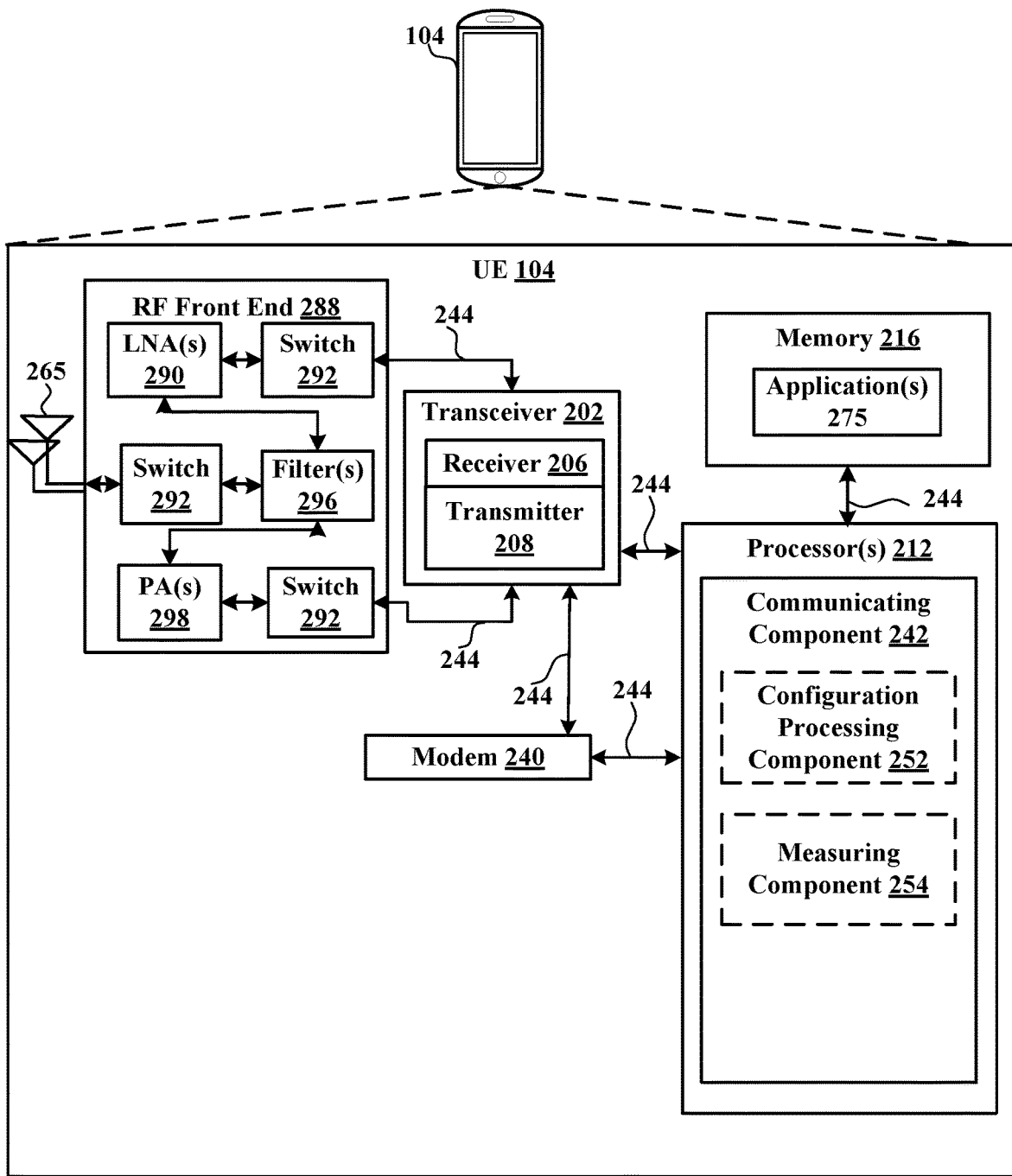
FIG. 2 is a block diagram illustrating an example of a UE, in accordance with various aspects of the present disclosure.
Figure 3:
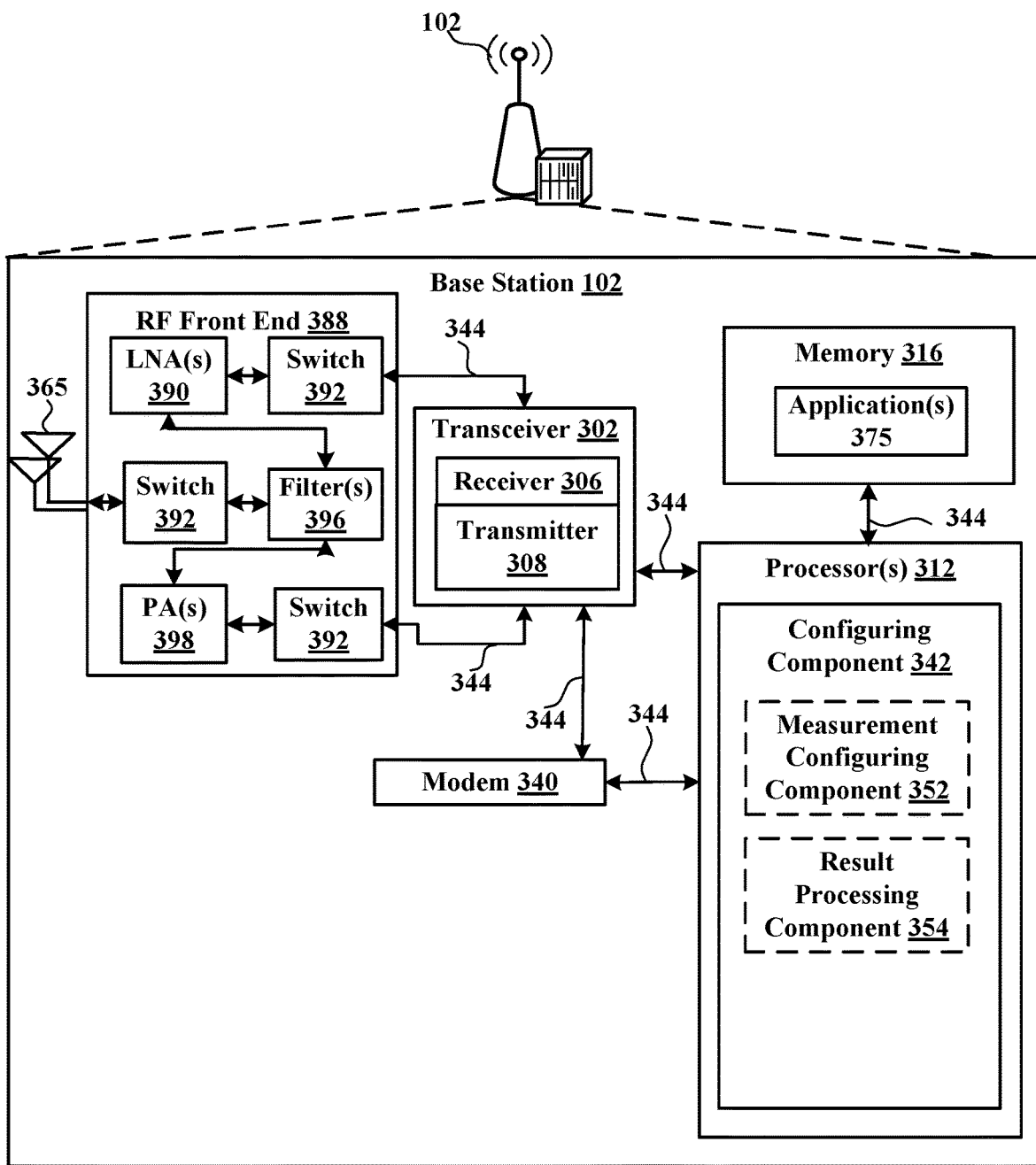
FIG. 3 is a block diagram illustrating an example of a base station, in accordance with various aspects of the present disclosure.
Figure 4:
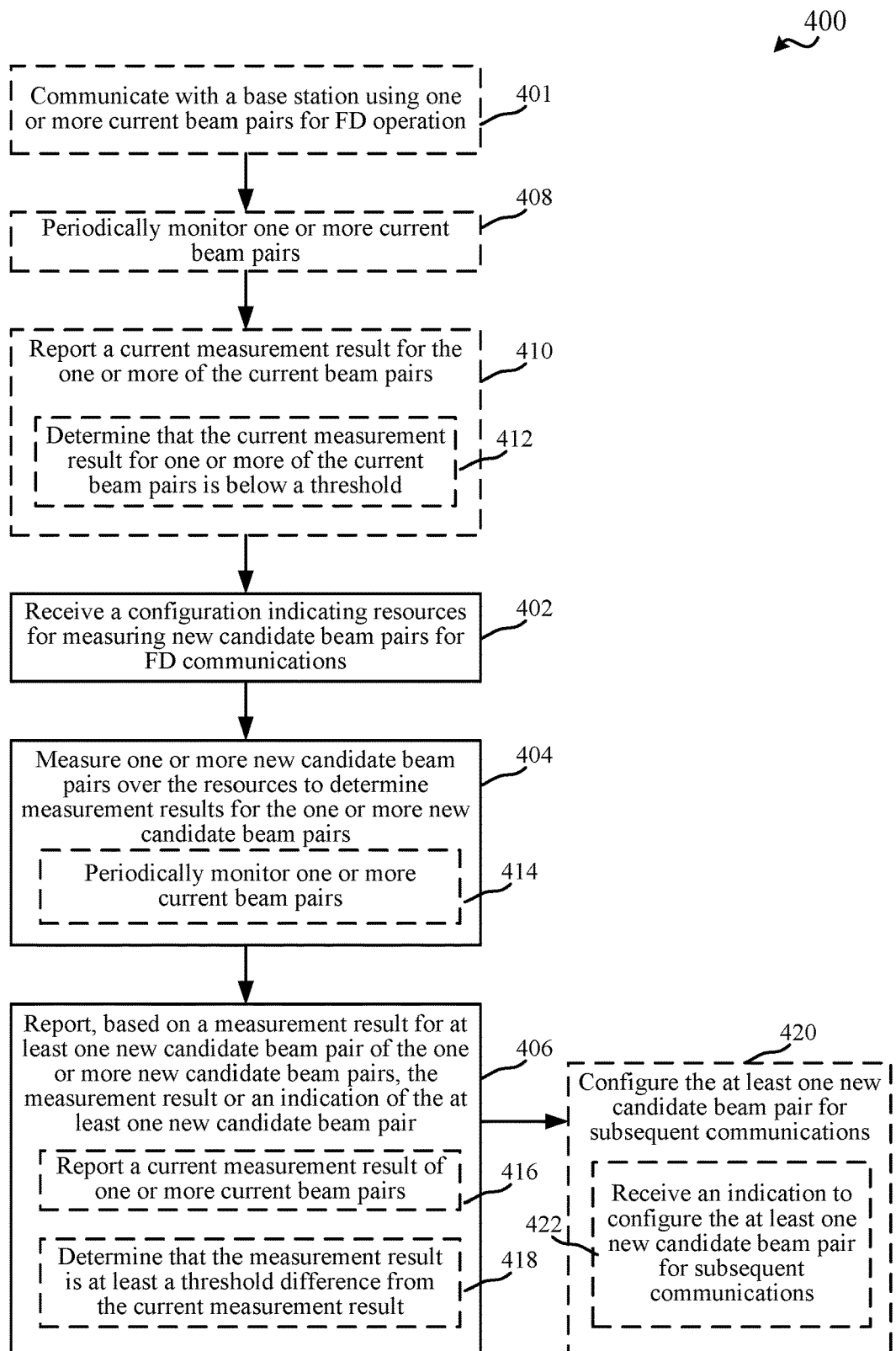
FIG. 4 is a flow chart illustrating an example of a method for measuring and/or reporting new candidate beam pairs, in accordance with various aspects of the present disclosure.
Figure 5:
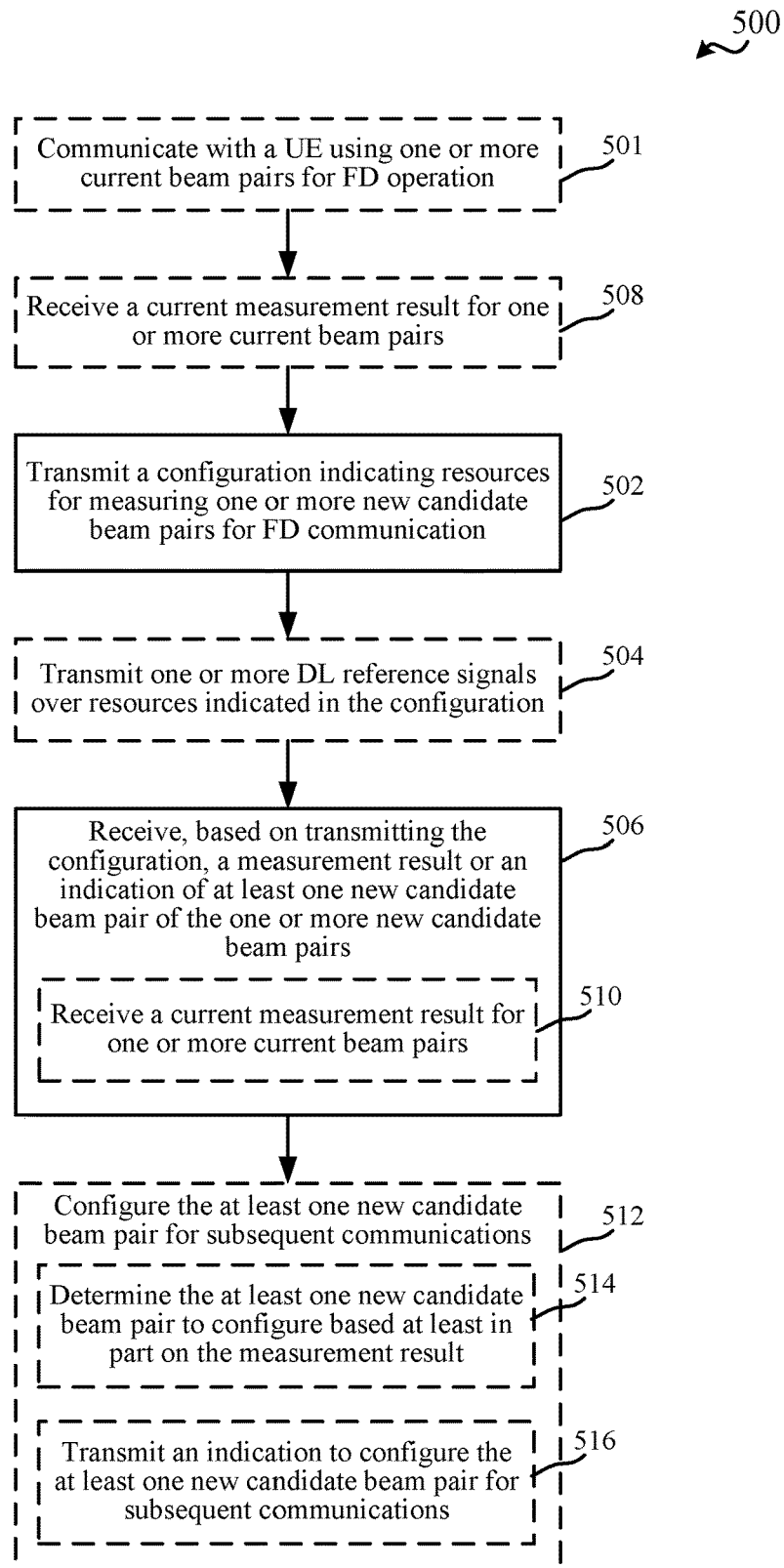
FIG. 5 is a flow chart illustrating an example of a method for configuring a device for measuring and/or reporting new candidate beam pairs, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for measuring and reporting candidate beam pairs, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a configuration processing component 252 for processing a configuration for measuring new candidate beam pairs for FD communications, and/or a measuring component 254 for measuring one or more new candidate beam pairs and/or reporting a measurement result of the one or more new candidate beam pairs, in accordance with aspects described herein.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring a device to measure and report candidate beam pairs, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a measurement configuring component 352 for configuring a UE to measure new candidate beam pairs for FD communications, and/or a result processing component 354 for processing one or more measurement results received from a UE for new candidate beam pairs, in accordance with aspects described herein.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for measuring new candidate beam pairs, in accordance with aspects described herein. In an example, a UE 104 can perform the functions described in method 400 using one or more of the components described in FIGS. 1 and 2.

In method 400, optionally at Block 401, a base station can be communicated with using one or more current beam pairs for FD operation. In an aspect, communicating component 242, e.g., in conjunction with processor(s) 212, memory 216, transceiver 202, etc., can communicate with the base station (e.g., base station 102) using the one or more current beam pairs for FD operation. For example, the UE 104 can communicate with a base station 102 using one or more current beam pairs that may have initially been determined as having desirable signal metrics or otherwise not exhibit self-interference. The base station 102 can configure the UE 104 with the one or more current beams as an initial configuration based on reported measurements, using one or more techniques described herein (e.g., for reporting and/or configuring a new candidate beam pair from a previous beam pair, etc.).

In method 400, at Block 402, a configuration indicating resources for measuring new candidate beam pairs for FD communications can be received. In an aspect, configuration processing component 252, e.g., in conjunction with processor(s) 212, memory 216, transceiver 202, communicating component 242, etc., can receive the configuration indicating resources for measuring new candidate beam pairs for FD communications. As described, due to various factors including UE mobility/rotation, clutter movement, etc., the current beam pair(s) may become undesirable or otherwise may start to exhibit self-interference at the UE 104. Accordingly, the received configuration can include one or more parameters, which the UE 104 can use, to measure other new candidate beam pairs that can be used for subsequent communications. For example, the one or more parameters can relate to or can include time and/or frequency resources over which to measure signals from the base station 102 and/or concurrently transmit signals from the UE 104 to measure self-interference of a beam pair (e.g., where the receive beam is used to receive the signals from the base station 102 and the transmit beam is used to transmit signals from the UE 104), etc. In an example, configuration processing component 252 can receive the configuration in higher layer signaling from the base station 102, e.g., in radio resource control (RRC) signaling, system information, or other broadcast signaling. In another example, configuration processing component 252 can receive the configuration in dedicated control signaling from the base station 102, such as in downlink control information (DCI) over a downlink control channel (e.g., physical downlink control channel (PDCCH)), downlink data channel (e.g., physical downlink shared channel (PDSCH)), etc.

In method 400, at Block 404, one or more new candidate beam pairs can be measured over the resources to determine measurement results for the one or more new candidate beam pairs. In an aspect, measuring component 254, e.g., in conjunction with processor(s) 212, memory 216, transceiver 202, communicating component 242, etc., can measure the one or more (e.g., multiple) new candidate beam pairs over the resources to determine measurement results for the one or more new candidate beam pairs. For example, measuring component 254 can receive a signal received from the base station 102 over the resources (e.g., time and/or frequency resources) indicated in the configuration. In an example, the base station 102 can transmit a downlink reference signal over the resources, such as a DL channel state information reference signal (CSI-RS) or other DL reference signal, and measuring component 254 can measure one or more metrics of the reference signal as received based on a receive beam of the new candidate beam pair. In addition, measuring component 254 can determine to transmit an uplink signal, such as an uplink reference signal (e.g., sounding reference signal (SRS) or other UL reference signal) over similar resources and based on a transmit beam of the new candidate beam pair.

In this regard, for example, measuring component 254 can determine the one or more metrics, or other a measurement result, for the new candidate beam pair as a signal strength or quality measurement of the DL reference signal as received with possible self-interference from the UL signal. For example, measuring component 254 can measure a received signal strength indicator (RSSI), reference signal received power (RSRP), reference signal received quality (RSRQ), signal-to-noise ratio (SNR), signal-to-interference-and-noise ratio (SINR), etc. of the received signal. In an example, measuring component 254 can determine the measurement result for multiple new candidate beam pairs based on the configuration, by receiving DL reference signals from the base station 102 using different receive beams, and/or transmitting UL signals concurrently with receiving the DL reference signals using different transmit beams, over indicated resources. For example, measuring component 254 can, for a given transmit beam, transmit the UL signal while receiving the DL reference signal for each receive beam, and may repeat for multiple transmit beams (and/or vice versa), such to measure multiple new candidate beam pairs. In one example, the configuration can indicate which beam pairs and/or associated beams to measure. In another example, measuring component 254 can determine which beam pairs to measure (e.g., all possible beam pairs configured for the UE 104, a subset of beam pairs that may be indicated in a separate configuration from the base station 102, etc.).

In addition, in examples described further herein, measuring component 254 may periodically measure the current beam pair(s) and may request measurement configuration for other new candidate beam pairs when the current beam pair(s) achieve a threshold self-interference (or fail to achieve a certain quality threshold). In this example, configuration processing component 252 may receive the configuration, based on requesting the measurement configuration, in DCI. In another example, measuring component 254 may be configured with the configuration for measuring other new candidate beam pairs when measuring current beam pair(s) to determine when other new candidate beam pairs exhibit less than a threshold self-interference (or achieve a certain quality threshold), exhibit a level of self-interference that is at least a threshold less than that of the current beam pair(s) (or achieve a certain quality that is at least a threshold better than that of the current beam pair(s)), etc. In this example, configuration processing component 252 may receive the configuration in higher layer signaling (e.g., RRC), system information, other broadcast signaling, DCI, etc.

In method 400, at Block 406, based on a measurement result for at least one new candidate beam pair of the one or more new candidate beam pairs, the measurement result or an indication of the at least one new candidate beam pair can be reported. In an aspect, measuring component 254, e.g., in conjunction with processor(s) 212, memory 216, transceiver 202, communicating component 242, etc., can report, based on the measurement result for at least one new candidate beam pair of the one or more new candidate beam pairs, the measurement result or an indication of the at least one new candidate beam pair. For example, measuring component 254 can send the measurement result or the indication of the at least one beam pair to the base station 102. In one example, where the UE 104 communicates in FD with different TRPs of the base station 102, measuring component 254 can report the measurement result or the indication of the at least one beam pair to one or more of the different TRPs (e.g., and/or one TRP can indicate a beam to the other TRP to use in subsequent communications with the UE 104).

In an example, measuring component 254 can report the measurement result or the indication of the at least one beam pair in resources indicated, by the base station 102 (e.g., in the configuration), for reporting. In other examples, measuring component 254 can report the measurement result or the indication of the at least one beam pair in uplink control information (UCI) over an uplink control channel (e.g., physical uplink control channel (PUCCH)), uplink data channel (e.g., physical uplink shared channel (PUSCH)), etc. For example, the PUCCH or PUSCH can be configured or dynamically allocated based on a scheduling request (SR) transmitted by the UE 104 to the base station 102 (e.g., the SR can be sent over PUCCH or in a random access procedure, such as a contention-free random access (CFRA) or contention-based random access (CBRA) procedure), etc. In another example, measuring component 254 can report a failure indication in a CFRA procedure (e.g., using reserved random access preambles to report a failure indication, where the reserved random access preambles can be configured for the UE 104 by the base station 102 or otherwise). In another example, measuring component 254 can report a failure indication in a CBRA procedure (e.g., using MAC-CE in a random access message, such as msg3 in a four-step random access procedure or msgA in a two-step random access procedure, to report failure indication), etc.

In one specific example, the UE 104 can periodically monitor only current FD beam pair(s). Based on UE 104 monitoring and reporting of the quality of current FD beam pair(s), the base station (e.g., gNB) can further configure measurement for new candidate FD beam pair(s). In this example, in method 400, optionally at Block 408, one or more current beam pairs can be monitored. In an aspect, measuring component 254, e.g., in conjunction with processor(s) 212, memory 216, transceiver 202, communicating component 242, etc., can periodically monitor the one or more current beam pairs. In one example, this can be based on another configuration received from the base station 102, which can indicate resources for monitoring the one or more current beam pairs. In another example, measuring component 254 can periodically measure signals received from the base station 102 in time periods where the UE 104 also transmits signals to the base station 102 or other device. Measuring component 254 can measure the received signal quality, RSSI, RSRP, RSRQ, SNR, SINR, etc. in such cases. In one example, as described, the base station 102 can configure the UE 104 with time periods for receiving DL reference signals from the base station 102, during which the UE 104 can transmit UL signals using the transmit beam of the current beam pair(s) and measure the RSRP, SINR, etc. of the signals received from the base station 102 using the receive beam of the current beam pair(s).

In this example, in method 400, optionally at Block 410, a current measurement result for the one or more of the current beam pairs can be reported. In an aspect, measuring component 254, e.g., in conjunction with processor(s) 212, memory 216, transceiver 202, communicating component 242, etc., can report the current measurement result for the one or more of the current beam pairs. For example, measuring component 254 can transmit an indication of the current measurement result to the base station 102 (e.g., in UCI over PUCCH or PUSCH resources), or can transmit a failure indication to the base station 102 (e.g., in or by using CFRA reserved preamble or CBRA MAC-CE, as described above). In one example, measuring component 254 can periodically measure and report the current measurement result for the current beam pair(s) via configured PUCCH/PUSCH resources (e.g., which may be indicated in a configuration transmitted from the base station 102 to the UE 104).

In another example, in reporting the current measurement result at Block 410, optionally at Block 412, it can be determined that the current measurement result for one or more of the current beam pairs is below a threshold, and reporting the current measurement may be based on this determination. In an aspect, measuring component 254, e.g., in conjunction with processor(s) 212, memory 216, transceiver 202, communicating component 242, etc., can determine that the current measurement result for one or more of the current beam pairs is below the threshold. In one example, measuring component 254 can determine that at least one (e.g., any) of the one or more current beam pairs has a current measurement result that is below a threshold. For example, the threshold can be configured in a configuration from the base station 102 or otherwise known by the UE 104 (e.g., configured in memory 216). Based on this determination, for example, measuring component 254 can report the current measurement result of the at least one current beam pair (e.g., to the base station 102). In an example, measuring component 254 can transmit the report via configured PUCCH/PUSCH resources, or dynamically allocated PUCCH/PUSCH resources. In an example, communicating component 242 can transmit a SR to the base station 102 to solicit the dynamic resource allocation. In one example, communicating component can transmit the SR over PUCCH or CFRA/CBRA based RACH, etc.

In another example, measuring component 254 can determine that all of the one or more current beam pairs have a current measurement result that is below a threshold. For example, the threshold can be configured in a configuration from the base station 102 or otherwise known by the UE 104 (e.g., configured in memory 216). Based on this determination, for example, measuring component 254 can report a failure indication (e.g., to the base station 102). For example, measuring component 254 can report the failure indication via configured PUCCH/PUSCH resources, or dynamically allocated PUCCH/PUSCH resources (e.g., where dynamically allocated resources can be solicited as described above). In another example, measuring component 254 can report the failure indication by using random access preambles in CFRA procedure that are reserved for failure indication, using a MAC-CE in a CBRA procedure to indicate the failure, etc.

In any case, for example, where the UE 104 reports the current measurement result of current beam pairs and/or failure indication, configuration processing component 252 may receive and/or process the configuration for measuring and reporting new candidate beam pairs based on reporting the current measurement result and/or failure indication. In this example, measuring component 254 can accordingly measure and report measurement results or indications of new candidate beam pair(s) for configuration for subsequent communications.

In another specific example, UE 104 can periodically measure potential FD beam pair(s) in addition to current FD beam pair(s), where measuring the potential FD beam pair(s) and current FD beam pair(s) can be based on the configuration received from the base station 102. In this example, in measuring the one or more new candidate beam pairs at Block 404, optionally at Block 414, one or more current beam pairs can be periodically monitored. In an aspect, measuring component 254, e.g., in conjunction with processor(s) 212, memory 216, transceiver 202, communicating component 242, etc., can periodically monitor the one or more current beam pairs. In one example, this can be based the configuration received from the base station 102 (e.g., at Block 402), which can indicate resources for monitoring the candidate beams as well as one or more current beam pairs. In another example, measuring component 254 can periodically measure signals received from the base station 102 in time periods where the UE 104 also transmits signals to the base station 102 or other device, as described. Measuring component 254 can measure the received signal quality, RSSI, RSRP, RSRQ, SNR, SINR, etc. in such cases. In one example, as described, the base station 102 can configure the UE 104 with time periods for receiving DL reference signals from the base station 102, during which the UE 104 can transmit UL signals using the transmit beam of the new candidate beam pairs and/or the one or more current beam pairs, and measure the RSRP, SINR, etc. of the signals received from the base station 102 using the receive beam of the new candidate beam pairs and/or the one or more current beam pairs.

In this example, in reporting the measurement result or indication of the at least one new candidate beam pair at Block 406, optionally at Block 416, a current measurement result of one or more current beam pairs can be reported. In an aspect, measuring component 254, e.g., in conjunction with processor(s) 212, memory 216, transceiver 202, communicating component 242, etc., can report the current measurement result of the one or more current beam pairs. For example, measuring component 254 can report the current measurement result along with the measurement result or the indication of the at least one new candidate beam pair, as described above. Thus, in one example, the base station 102 or other device receiving the report can determine whether to configure the at least one new candidate beam pair (e.g., instead of the current beam pair(s)). In this example, measuring component 254 can periodically report the quality of both potential and current FD beam pair(s). The base station 102 (e.g., gNB), or an FD operation manager, which may be part of the base station 102 or a network node in communication with the base station 102, may determine new FD beam pair(s) with better quality than current FD beam pair(s) based on the reported measurement results. In addition, in an example, measuring component 254 can report the at least one measurement result and the current measurement result via configured PUCCH/PUSCH resources.

In another example, in reporting the measurement result or indication of the at least one new candidate beam pair at Block 406, optionally at Block 418, it can be determined that the measurement result is at least a threshold difference from the current measurement result, and reporting the measurement result or indication of the at least one new candidate beam pair can be based on this determination. In an aspect, measuring component 254, e.g., in conjunction with processor(s) 212, memory 216, transceiver 202, communicating component 242, etc., can determine that the measurement result (e.g., of the at least one new candidate beam pair) is at least a threshold difference from the current measurement result (e.g., of the one or more current beam pairs). For example, measuring component 254 can compare the measurement result of the at least one new candidate beam pair to the current measurement result to determine the difference (e.g., based on subtracting the results) and can determine whether the difference achieves (e.g., is at least) a threshold difference, where the threshold can be configured by the base station 102 or otherwise known by the UE 104 (e.g., stored in memory 216). In one example, the threshold can be zero or the measuring component 254 can otherwise determine that the measurement result for the at least one new candidate beam pair is better than the current measurement result of the one or more current beam pairs. In any case, if it is determined that the measurement result is at least a threshold difference from the current measurement result, measuring component 254 can report the measurement result or the indication of the at least one new candidate beam pair based on this determination, and the base station 102 can determine to switch the beam pair based on the report.

In yet another example, measuring component 254 can report measurements of a number of beam pairs, regardless of whether the beam pairs are new candidate beam pairs or current beam pairs, based on the measurement result. In this example, the base station 102 can determine whether to configure a new beam pair or keep the current beam pair(s) based on the reported measurement results. In an example, reporting the measurement result or indication of the at least one new candidate beam pair at Block 406 can include reporting the multiple measurement results or indications of multiple new candidate beam pairs and/or the current measurement results of the one or more current beam pairs based on determining which beam pairs have the best signal quality (e.g., based on determining FD beam pair(s) with top X best qualities, among all potential and current FD beam pairs, where X is a positive integer). As described, for example, measuring component 254 can report the FD beam pairs based on identifying the FD beam pairs and/or may also include the corresponding beam metrics (e.g., measurement result) for each of the reported FD beam pairs in the reports. In addition, as described, measuring component 254 can report via configured PUCCH/PUSCH resources, or dynamically allocated PUCCH/PUSCH resources (e.g., solicited by SR sent from the UE 104, where the SR can be sent over PUCCH or CFRA/CBRA based RACH, etc.).

In method 400, optionally at Block 420, the at least one new candidate beam pair can be configured for subsequent communications. In an aspect, communicating component 242, e.g., in conjunction with processor(s) 212, memory 216, transceiver 202, etc., can configure the at least one new candidate beam pair for subsequent communications. In one example, communicating component 242 can configure the at least one new candidate beam pair based on determining to report the at least one new candidate beam pair to the base station 102, which can be based on one or more other determinations described above (e.g., determining that the at least one new candidate beam pair has a measurement result that indicates an acceptable level of self-interference (e.g., the signal quality achieves a threshold), determining that the at least one new candidate beam pair has a measurement result that is at least a threshold difference from the current measurement result of one or more current beam pairs, etc.).

In another example, in configuring the at least one new candidate beam pair at Block 420, optionally at Block 422, an indication to configure the at least one new candidate beam pair for subsequent communications can be received. In an aspect, communicating component 242, e.g., in conjunction with processor(s) 212, memory 216, transceiver 202, etc., can receive (e.g., from the base station 102) the indication to configure the at least one new candidate beam pair for subsequent communications. For example, base station 102 can determine to configure the new beam pair, as described further herein, based on the various received measurement results, and can transmit the indication to the UE 104 to configure the new beam pair. Communicating component 242 can accordingly receive the indication and configure the new beam pair (e.g., instead of the current beam pair(s) or in addition to the current beam pair(s)) for subsequent FD communications.

FIG. 5 illustrates a flow chart of an example of a method 500 for configuring a device for measuring new candidate beam pairs, in accordance with aspects described herein. In an example, a base station can perform the functions described in method 500 using one or more of the components described in FIGS. 1 and 3.

In method 500, optionally at Block 501, a UE can be communicated with using one or more current beam pairs for FD operation. In an aspect, configuring component 342, e.g., in conjunction with processor(s) 312, memory 316, transceiver 302, etc., can communicate with the UE (e.g., UE 104) using the one or more current beam pairs for FD operation. For example, the base station 102 can communicate with the UE 104 using one or more current beam pairs that may have initially been determined as having desirable signal metrics or otherwise not exhibit self-interference. The base station 102 can configure the UE 104 with the one or more current beams as an initial configuration based on reported measurements, using one or more techniques described herein (e.g., for reporting and/or configuring a new candidate beam pair from a previous beam pair, etc.).

In method 500, at Block 502, a configuration indicating resources for measuring one or more new candidate beam pairs for FD communications can be transmitted. In an aspect, measurement configuring component 352, e.g., in conjunction with processor(s) 312, memory 316, transceiver 302, configuring component 342, etc., can generate and transmit the configuration indicating resources for measuring the one or more (e.g., multiple) new candidate beam pairs for FD commutation. For example, measurement configuring component 352 can generate the configuration to indicate at least resources over which a UE 104 can measure multiple new candidate beam pairs. In addition, for example, measurement configuring component 352 can transmit the measurement configuration to the UE 104 using higher layer signaling (e.g., RRC signaling, system information, other broadcast signaling, etc.), using DCI (e.g., in a PDCCH or PDSCH), etc. In an example, measurement configuring component 352 may transmit the measurement configuration to the UE 104 using a certain type of signaling based on whether the UE 104 requests the measurement configuration (e.g., when the current beam pair measurement result is below a threshold) or whether the UE 104 is provided the measurement configuration for periodically measuring new candidate beam pairs. For example, measurement configuring component 352 may transmit the measurement configuration periodically in RRC signaling and also upon request from the UE 104 over DCI.

In method 500, optionally at Block 504, one or more DL reference signals can be transmitted over resources indicated in the configuration. In an aspect, configuring component 342, e.g., in conjunction with processor(s) 312, memory 316, transceiver 302, etc., can transmit the one or more DL reference signals over the resources indicated in the configuration. In another example, other base stations or devices can transmit the one or more DL reference signals over the resources. In any case, this can allow the UE 104 to measure the DL reference signals along with interference caused by the UE 104 transmitting UL signals, as described above, to generate and report a measurement result based on candidate beam pairs used to receive the DL reference signals and transmit the UL signals.

In method 500, at Block 506, a measurement result or an indication of at least one new candidate beam pair of the one or more new candidate beam pairs can be received based on transmitting the configuration. In an aspect, result processing component 354, e.g., in conjunction with processor(s) 312, memory 316, transceiver 302, configuring component 342, etc., can receive (e.g., from the UE), based on transmitting the configuration, the measurement result or the indication of the at least one new candidate beam pair of the one or more new candidate beam pairs. As described, the UE 104 can measure new candidate beam pairs over resources indicated in the measurement configuration, and can provide associated measurement results or a selection of a new candidate beam pair to the base station 102.

In one example, in method 500, optionally at Block 508, a current measurement result for one or more current beam pairs can be received. In an aspect, measurement configuring component 352, e.g., in conjunction with processor(s) 312, memory 316, transceiver 302, configuring component 342, etc., can receive (e.g., from the UE) the current measurement result for the one or more current beam pairs. In an example, measurement configuring component 352 can transmit the configuration (e.g., at Block 502) based on receiving the current measurement result. As described above, the UE 104 can periodically measure the one or more current beam pairs and can transmit a corresponding measurement result to the base station 102 (e.g., over configured PUCCH/PUSCH resources). In this example, measurement configuring component 352 can receive the current measurement result and determine whether to transmit the configuration based on the current measurement result (e.g., where the current measurement result does not achieve a threshold or otherwise indicates an undesirable level of self-interference).

In another example, as described above, the UE 104 can report the current measurement result of at least a portion of the one or more current beam pairs when at least one (or all) of the current beam pairs have a current measurement result that falls below a threshold. In this example, measurement configuring component 352 can receive the current measurement result from the UE 104 (e.g., in configured or dynamic PUCCH/PUSCH resources, where the dynamic resources may be solicited by receiving a SR from the UE 104 and configuring component 342 accordingly scheduling the dynamic resources for the UE 104 and/or where the SR can be received from the UE 104 over PUCCH resources or CFRA/CBRA based RACH). For example, measurement configuring component 352 can determine to transmit the measurement configuration based on receiving the current measurement result or the result itself (e.g., based on comparing the current measurement result to a threshold configured at the base station 102 or other determinations). In yet another example, the UE 104 can report a failure indication (e.g., using reserved preambles in a CFRA based RACH, where the reserved preambles can be configured by the base station 102 for reporting the failure, or using MAC-CE in CBRA to indicate failure, etc.) indicating failure of all current beam pairs (e.g., measurement result for all current beam pairs below a threshold). In this example, measurement configuring component 352 can determine to transmit the measurement configuration to the UE 104 based on receiving the failure indication.

In another example, in receiving the measurement result or the indication of at least one new candidate beam pair at Block 506, optionally at Block 510, a current measurement result for one or more current beam pairs can be received. In an aspect, result processing component 354, e.g., in conjunction with processor(s) 312, memory 316, transceiver 302, configuring component 342, etc., can receive (e.g., from the UE) the current measurement result for the one or more current beam pairs along with the measurement result or indication of the at least one new candidate beam pair. As described, for example, the base station 102 can configure the UE 104 to periodically measure and/or report measurement results for both the one or more current beam pairs and the multiple new candidate beam pairs. In this example, result processing component 354 can receive these measurement results from the UE 104.

As described, for example, result processing component 354 can periodically receive reports of the quality of both potential and current FD beam pairs from the UE 104 (e.g., over configured PUCCH/PUSCH resources). In this example, result processing component 354 of the base station 102 (or a similar component of a FD operation manager or other component of the wireless network) can determine a new FD beam pair to configure over the current FD beam pairs. In another example, result processing component 354 can receive the report if at least one potential FD beam pair has a better signal quality, a difference in signal quality that achieves a threshold, etc., than at least one current FD beam pair. For example, result processing component 354 can receive a report of FD beam pairs with top X best qualities among all potential and current FD beam pairs (e.g., regardless of whether the reported beam pairs are current or new candidate beam pairs). In another example, result processing component 354 can receive a report of FD beam pairs that includes the associated beam metrics to allow result processing component 354 to determine which of the reported beam pairs to configure for the UE 104. In addition, as described, result processing component 354 can receive the report in configured PUCCH/PUSCH resources, dynamically allocated PUCCH/PUSCH resources (e.g., solicited by a SR), etc.

In method 500, optionally at Block 512, the at least one new candidate beam pair can be configured for subsequent communications. In an aspect, result processing component 354, e.g., in conjunction with processor(s) 312, memory 316, transceiver 302, configuring component 342, etc., can determine to configure the at least one new candidate beam pair for subsequent communications based on comparing the measurement results, and configuring component 342 can accordingly configure the at least one new candidate beam pair for subsequent communications.

For example, in configuring the at least one new candidate beam pair at Block 512, optionally at Block 514, the at least one new candidate beam pair can be determined to configure based at least in part on the measurement result. In an aspect, result processing component 354, e.g., in conjunction with processor(s) 312, memory 316, transceiver 302, configuring component 342, etc., can determine the at least one new candidate beam pair to configure based at least in part on the measurement result. For example, result processing component 354 can determine that the at least one new candidate beam pair has a measurement result that is better than a current measurement result of a current beam pair, a measurement result that is at least a threshold better than the current measurement result, etc. For example, result processing component 354 can compare the measurement results, as described, to determine whether to configure a new candidate beam pair and/or keep using a current beam pair. Where the new candidate beam pair is to be configured, configuring component 342 can transmit, to the UE 104, an indication to configure the new candidate beam pair and/or can configure the new candidate beam pair for use at the base station 102 as well.

For example, in configuring the at least one new candidate beam pair at Block 512, optionally at Block 516, an indication to configure the at least one new candidate beam pair for subsequent communications can be transmitted. In an aspect, configuring component 342, e.g., in conjunction with processor(s) 312, memory 316, transceiver 302, etc., can transmit an indication to configure the at least one new candidate beam pair for subsequent communications. For example, configuring component 342 can transmit the indication to the UE 104 (e.g., in DCI, MAC-CE, or other downlink signaling) to allow the UE 104 to switch to the new candidate beam pair. In other examples, however, the UE 104 can switch to the new candidate beam pair based on evaluating its measurement results, as described above. In yet another example, configuring component 342 can transmit the indication to a TRP of the base station 102. For example, where the base station 102 uses a first TRP for downlink transmission and a second TRP for uplink reception, one TRP can receive the report from the UE 104, and the base station 102 can configure the new candidate beam pair (or at least a transmit or receive beam of the new candidate beam pair) to one or both of the TRPs.

Figure 6:
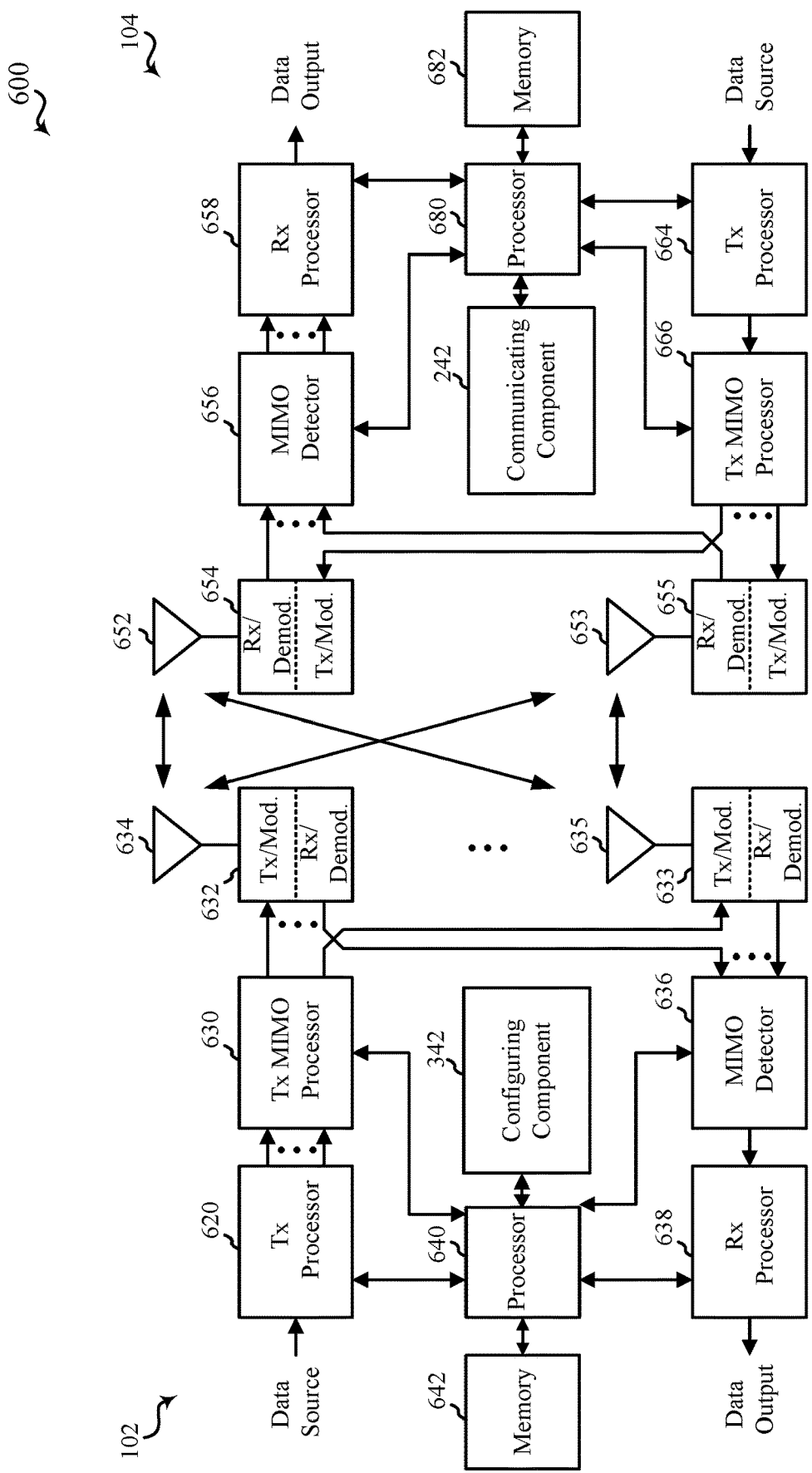
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a configuring component 342 (see e.g., FIGS. 1 and 3).

The following aspects are illustrative only and aspects thereof may be combined with aspects of other embodiments or teaching described herein, without limitation.

Aspect 1 is a method for wireless communication that may include communicating with a base station using one or more current beam pairs for full-duplex operation, and includes receiving a configuration indicating resources for measuring new candidate beam pairs for full-duplex operation, measuring one or more new candidate beam pairs over the resources to determine measurement results for the one or more new candidate beam pairs, and reporting, based on a measurement result for at least one new candidate beam pair of the one or more new candidate beam pairs, the measurement result or an indication of the at least one new candidate beam pair.

In Aspect 2, the method of Aspect 1 includes periodically monitoring one or more current beam pairs, where receiving the configuration is based on reporting a current measurement result for at least one of the one or more current beam pairs.

In Aspect 3, the method of Aspect 2 includes reporting the current measurement result for the one or more of the current beam pairs over uplink control channel or uplink data channel resources.

In Aspect 4, the method of any of Aspects 2 or 3 includes reporting, based on determining the current measurement result falls below a threshold, the current measurement result over uplink control channel or uplink data channel resources.

In Aspect 5, the method of Aspect 4 includes where the uplink control channel or uplink data channel resources are dynamically allocated based on a transmitted scheduling request.

In Aspect 6, the method of Aspect 5 includes transmitting the transmitted scheduling request over uplink control channel resources or using a contention free random access or contention-based random access procedure.

In Aspect 7, the method of any of Aspects 2 to 6 includes reporting, based on determining the current measurement result for multiple current beam pairs falls below a threshold, the current measurement result for the multiple current beam pairs over uplink control channel or uplink data channel resources.

In Aspect 8, the method of Aspect 7 includes where reporting the current measurement result includes transmitting the current measurement result or a failure indication using a contention free random access or contention-based random access procedure.

In Aspect 9, the method of any of Aspects 1 to 7 includes periodically monitoring one or more current beam pairs in addition to measuring the one or more new candidate beam pairs, and reporting a current measurement result of the one or more current beam pairs.

In Aspect 10, the method of Aspect 9 includes where reporting the measurement result and reporting the current measurement result over uplink control channel or uplink data channel resources.

In Aspect 11, the method of any of Aspects 9 or 10 includes where reporting the indication of the at least one new candidate beam pair is based on determining that the measurement result is at least a threshold difference from the current measurement result.

In Aspect 12, the method of Aspect 11 includes where reporting the indication of the at least one new candidate beam pair includes reporting one or more indications for a subset of the one or more new candidate beam pairs determined to have corresponding measurement results at least a threshold difference from the current measurement result.

In Aspect 13, the method of Aspect 12 includes where reporting the measurement results of the at least one new candidate beam pair includes reporting one or more measurement results for the subset of the one or more new candidate beam pairs.

In Aspect 14, the method of any of Aspects 11 to 13 includes where reporting the measurement result or the indication of the at least one new candidate beam pair is over uplink control channel or uplink data channel resources.

In Aspect 15, the method of Aspect 14 includes where the uplink control channel or uplink data channel resources are dynamically allocated based on a transmitted scheduling request.

In Aspect 16, the method of Aspect 15 includes transmitting the transmitted scheduling request over uplink control channel resources or using a contention free random access or contention-based random access procedure.

In Aspect 17, the method of any of Aspects 1 to 16 includes where measuring the one or more new candidate beam pairs comprises transmitting an uplink reference signal while measuring a downlink reference signal in a time period.

In Aspect 18, the method of Aspect 17 includes where the uplink reference signal includes a sounding reference signal.

In Aspect 19, the method of any of Aspects 17 or 18 includes where the downlink reference signal includes a channel state information reference signal.

In Aspect 20, the method of any of Aspects 17 to 19 includes where the measuring includes measuring at least one of a reference signal received power or a signal-to-interference-and-noise ratio of the downlink reference signal in the time period.

Aspect 21 is a method for wireless communication that may include communicating with a base station using one or more current beam pairs for full-duplex operation, and includes transmitting a configuration indicating resources for measuring one or more new candidate beam pairs for full-duplex operation, and receiving, based on transmitting the configuration, a measurement result or an indication of at least one new candidate beam pair of the one or more new candidate beam pairs.

In Aspect 22, the method of Aspect 21 includes where transmitting the configuration is based on receiving a current measurement result for at least one of the one or more current beam pairs.

In Aspect 23, the method of Aspect 22 includes receiving the current measurement result for the one or more of the current beam pairs over uplink control channel or uplink data channel resources.

In Aspect 24, the method of any of Aspects 22 or 23 includes receiving the current measurement result over uplink control channel or uplink data channel resources.

In Aspect 25, the method of Aspect 24 includes where the uplink control channel or uplink data channel resources are dynamically allocated based on a received scheduling request.

In Aspect 26, the method of Aspect 25 includes receiving the received scheduling request over uplink control channel resources or using a contention free random access or contention-based random access procedure.

In Aspect 27, the method of any of Aspects 22 to 26 includes receiving the current measurement result for the one or more current beam pairs over uplink control channel or uplink data channel resources.

In Aspect 28, the method of Aspect 27 includes where receiving the current measurement result includes receiving the current measurement result or a failure indication using a contention free random access or contention-based random access procedure.

In Aspect 29, the method of any of Aspects 22 to 28 includes configuring, based on receiving the measurement result or the indication of the at least one new candidate beam pair, the at least one new candidate beam pair for subsequent communications.

In Aspect 30, the method of any of Aspects 20 to 29 includes receiving a current measurement result of the one or more current beam pairs.

In Aspect 31, the method of Aspect 30 includes where receiving the measurement result and receiving the current measurement result over uplink control channel or uplink data channel resources.

In Aspect 32, the method of any of Aspects 30 or 31 includes where receiving the indication of the at least one new candidate beam pair includes receiving one or more indications for a subset of the one or more new candidate beam pairs that have corresponding measurement results at least a threshold difference from the current measurement result.

In Aspect 33, the method of Aspect 32 includes where receiving the measurement results of the at least one new candidate beam pair includes receiving one or more measurement results for the subset of the one or more new candidate beam pairs.

In Aspect 34, the method of any of Aspects 30 to 33 includes where receiving the measurement result or the indication of the at least one new candidate beam pair is over uplink control channel or uplink data channel resources.

In Aspect 35, the method of Aspect 34 includes where the uplink control channel or uplink data channel resources are dynamically allocated based on a received scheduling request.

In Aspect 36, the method of Aspect 35 includes receiving the received scheduling request over uplink control channel resources or using a contention free random access or contention-based random access procedure.

In Aspect 37, the method of any of Aspects 30 to 36 includes configuring, based on receiving the measurement result and receiving the current measurement result, the at least one new candidate beam pair for subsequent communications.

Aspect 38 is an apparatus for wireless communication that includes a transceiver, a memory configured to store instructions, and one or more processors communicatively coupled with the memory and the transceiver. The one or more processors are configured to perform one or more of the methods of any of Aspects 1 to 37.

Aspect 39 is an apparatus for wireless communication including means for performing one or more of the methods of any of Aspects 1 to 37.

Aspect 40 is a computer-readable medium including code executable by one or more processors for wireless communications, the code including code for performing one or more of the methods of any of Aspects 1 to 37.

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors communicatively coupled with the memory and the transceiver, wherein the one or more processors are configured to execute the instructions to cause the apparatus to:
communicate with a base station using one or more current beam pairs for full-duplex operation;
receive a configuration indicating resources for measuring new candidate beam pairs for switching to from the one or more current beam pairs for the full-duplex operation;
measure one or more new candidate beam pairs over the resources to determine measurement results for the one or more new candidate beam pairs, wherein measuring the one or more new candidate beam pairs is based on transmitting an uplink reference signal, while measuring a downlink reference signal and the uplink reference signal as reflected, in a time period; and
report, based on a measurement result for at least one new candidate beam pair of the one or more new candidate beam pairs, the measurement result or an indication of the at least one new candidate beam pair.

2. The apparatus of claim 1, wherein the one or more processors are further configured to execute the instructions to cause the apparatus to periodically monitor the one or more current beam pairs, wherein the one or more processors are configured to execute the instructions to cause the apparatus to receive the configuration based on reporting a current measurement result for at least one of the one or more current beam pairs.

3. The apparatus of claim 2, wherein the one or more processors are further configured to execute the instructions to cause the apparatus to report the current measurement result for the one or more current beam pairs over uplink control channel or uplink data channel resources.

4. The apparatus of claim 2, wherein the one or more processors are further configured to execute the instructions to cause the apparatus to report, based on determining the current measurement result falls below a threshold, the current measurement result over uplink control channel or uplink data channel resources.

5. The apparatus of claim 4, wherein the uplink control channel or uplink data channel resources are dynamically allocated based on a transmitted scheduling request.

6. The apparatus of claim 5, wherein the one or more processors are further configured to execute the instructions to cause the apparatus to transmit the transmitted scheduling request over uplink control channel resources or using a contention free random access or contention-based random access procedure.

7. The apparatus of claim 2, wherein the one or more processors are further configured to execute the instructions to cause the apparatus to report, based on determining the current measurement result for multiple current beam pairs of the one or more current beam pairs falls below a threshold, the current measurement result for the multiple current beam pairs over uplink control channel or uplink data channel resources.

8. The apparatus of claim 7, wherein the one or more processors are configured to execute the instructions to cause the apparatus to report the current measurement result at least in part by transmitting the current measurement result or a failure indication using a contention free random access or contention-based random access procedure.

9. The apparatus of claim 1, wherein the one or more processors are further configured to execute the instructions to cause the apparatus to:
periodically monitor the one or more current beam pairs in addition to measuring the one or more new candidate beam pairs; and
report a current measurement result of the one or more current beam pairs.

10. The apparatus of claim 9, wherein the one or more processors are configured to execute the instructions to cause the apparatus to report the measurement result and report the current measurement result over uplink control channel or uplink data channel resources.

11. The apparatus of claim 9, wherein the one or more processors are further configured to execute the instructions to cause the apparatus to report the indication of the at least one new candidate beam pair based on determining that the measurement result is at least a threshold difference from the current measurement result.

12. The apparatus of claim 11, wherein the one or more processors are configured to execute the instructions to cause the apparatus to report one or more indications for a subset of the one or more new candidate beam pairs determined to have corresponding measurement results at least a threshold difference from the current measurement result.

13. The apparatus of claim 12, wherein the one or more processors are configured to execute the instructions to cause the apparatus to report one or more measurement results for the subset of the one or more new candidate beam pairs.

14. The apparatus of claim 11, wherein the one or more processors are configured to execute the instructions to cause the apparatus to report the measurement result or the indication of the at least one new candidate beam pair over uplink control channel or uplink data channel resources.

15. The apparatus of claim 14, wherein the uplink control channel or uplink data channel resources are dynamically allocated based on a transmitted scheduling request.

16. The apparatus of claim 15, wherein the one or more processors are further configured to execute the instructions to cause the apparatus to transmit the transmitted scheduling request over uplink control channel resources or using a contention free random access or contention-based random access procedure.

17. The apparatus of claim 1, wherein the uplink reference signal includes a sounding reference signal.

18. The apparatus of claim 1, wherein the downlink reference signal includes a channel state information reference signal.

19. The apparatus of claim 1, wherein the one or more processors are configured to execute the instructions to cause the apparatus to measure at least one of a reference signal received power or a signal-to-interference-and-noise ratio of the downlink reference signal in the time period.

20. An apparatus for wireless communication, comprising:
a transceiver;
a memory configured to store instructions; and
one or more processors communicatively coupled with the memory and the transceiver, wherein the one or more processors are configured to execute the instructions to cause the apparatus to:
communicate with a user equipment using one or more current beam pairs for full- duplex operation;
transmit a configuration indicating resources for measuring one or more new candidate beam pairs for switching to from the one or more current beam pairs for the full-duplex operation, the configuration enabling the user equipment to measure the one or more new candidate beam pairs by transmitting an uplink reference signal while measuring both a downlink reference signal and a reflected portion of the transmitted uplink reference signal, and
receive, based on transmitting the configuration, a measurement result or an indication of at least one new candidate beam pair of the one or more new candidate beam pairs.

21. The apparatus of claim 20, wherein the one or more processors are configured to execute the instructions to cause the apparatus to transmit the configuration based on receiving a current measurement result for at least one of the one or more current beam pairs.

22. The apparatus of claim 21, wherein the one or more processors are further configured to execute the instructions to cause the apparatus to receive the current measurement result for the one or more current beam pairs over uplink control channel or uplink data channel resources.

23. The apparatus of claim 21, wherein the one or more processors are further configured to execute the instructions to cause the apparatus to receive the current measurement result over uplink control channel or uplink data channel resources.

24. The apparatus of claim 23, wherein the uplink control channel or uplink data channel resources are dynamically allocated based on a received scheduling request.

25. The apparatus of claim 24, wherein the one or more processors are further configured to execute the instructions to cause the apparatus to receive the received scheduling request over uplink control channel resources or using a contention free random access or contention-based random access procedure.

26. The apparatus of claim 21, wherein the one or more processors are further configured to execute the instructions to cause the apparatus to receive the current measurement result for the one or more current beam pairs over uplink control channel or uplink data channel resources.

27. The apparatus of claim 26, wherein the one or more processors are configured to execute the instructions to cause the apparatus to receive the current measurement result or a failure indication using a contention free random access or contention-based random access procedure.

28. A method for wireless communication, comprising:
communicating with a base station using one or more current beam pairs for full-duplex operation;
receiving a configuration indicating resources for measuring new candidate beam pairs for switching to from the one or more current beam pairs for the full-duplex operation,
measuring one or more new candidate beam pairs over the resources to determine measurement results for the one or more new candidate beam pairs, wherein measuring the one or more new candidate beam pairs is based on transmitting an uplink reference signal, while measuring a downlink reference signal and the uplink reference signal as reflected, in a time period; and
reporting, based on a measurement result for at least one new candidate beam pair of the one or more new candidate beam pairs, the measurement result or an indication of the at least one new candidate beam pair.

29. A method for wireless communication, comprising:
communicating with a user equipment using one or more current beam pairs for full-duplex operation;
transmitting a configuration indicating resources for measuring one or more new candidate beam pairs for switching to from the one or more current beam pairs for the full-duplex operation, the configuration enabling the user equipment to measure the one or more new candidate beam pairs by transmitting an uplink reference signal while measuring both a downlink reference signal and a reflected portion of the transmitted uplink reference signal; and
receiving, based on transmitting the configuration, a measurement result or an indication of at least one new candidate beam pair of the one or more new candidate beam pairs.

30. The method of claim 28, further comprising periodically monitoring the one or more current beam pairs, wherein receiving the configuration is based on reporting a current measurement result for at least one of the one or more current beam pairs.

* * * * *